(12) United States Patent
Yee et al.

(10) Patent No.: US 10,168,349 B2
(45) Date of Patent: Jan. 1, 2019

(54) BOLOMETER FLUID FLOW SENSOR

(71) Applicant: Robert Bosch GmbH, Stuttgart (DE)

(72) Inventors: Seow Yuen Yee, Mountain View, CA (US); Gary Yama, Mountain View, CA (US); Thomas Rocznik, Mountain View, CA (US)

(73) Assignee: Robert Bosch GmbH, Stuttgart (DE)

( * ) Notice: Subject to any disclaimer, the term of this patent is extended or adjusted under 35 U.S.C. 154(b) by 179 days.

(21) Appl. No.: 15/259,106

(22) Filed: Sep. 8, 2016

(65) Prior Publication Data

US 2018/0067143 A1    Mar. 8, 2018

(51) Int. Cl.

| | |
|---|---|
| *G01F 1/68* | (2006.01) |
| *G01P 5/26* | (2006.01) |
| *G01P 13/00* | (2006.01) |
| *G01J 5/00* | (2006.01) |
| *G01J 5/04* | (2006.01) |

(Continued)

(52) U.S. Cl.
CPC ................ *G01P 5/26* (2013.01); *G01F 1/68* (2013.01); *G01F 1/684* (2013.01); *G01F 1/69* (2013.01); *G01F 1/696* (2013.01); *G01F 1/699* (2013.01); *G01J 5/0037* (2013.01); *G01J 5/0265* (2013.01); *G01J 5/045* (2013.01); *G01J 5/06* (2013.01); *G01J 5/061* (2013.01); *G01J 5/0887* (2013.01); *G01J 5/20* (2013.01); *G01P 13/0006* (2013.01);
(Continued)

(58) Field of Classification Search
CPC ........................................................ G01P 5/26
See application file for complete search history.

(56) References Cited

U.S. PATENT DOCUMENTS

| | | | |
|---|---|---|---|
| 4,885,937 A * | 12/1989 | Tanaka ................ | G01F 1/6845 |
| | | | 73/170.12 |
| 5,291,781 A | 3/1994 | Nagata et al. | |

(Continued)

FOREIGN PATENT DOCUMENTS

EP    3035015 A1    6/2016

OTHER PUBLICATIONS

International Search Report corresponding to International Patent Application No. PCT/EP2017/072117 (5 pages).

(Continued)

*Primary Examiner* — David P Porta
*Assistant Examiner* — Jeremy S Valentiner
(74) *Attorney, Agent, or Firm* — Maginot Moore & Beck LLP

(57) ABSTRACT

A sensor comprises a substrate having a first surface; a cap structure connected to the substrate, the cap structure configured to define a cavity between an inner surface of the cap structure and the first surface of the substrate, the cap structure configured to block infrared radiation from entering the cavity from outside the cap structure; a plurality of absorbers, each absorber in the plurality of absorbers being connected to the first surface of the substrate and arranged at a respective position within the cavity and configured to absorb infrared radiation at the respective position within the cavity; and a plurality of readout circuits, each readout circuit in the plurality of readout circuits being connected to a respective absorber in the plurality of absorbers and configured to provide a measurement signal that indicates an amount of infrared radiation absorbed by the respective absorber.

13 Claims, 6 Drawing Sheets

(51) Int. Cl.
  *G01J 5/08*    (2006.01)
  *G01J 5/02*    (2006.01)
  *G01J 5/06*    (2006.01)
  *G01J 5/20*    (2006.01)
  *G01F 1/699*   (2006.01)
  *G01F 1/684*   (2006.01)
  *G01F 1/69*    (2006.01)
  *G01F 1/696*   (2006.01)

(52) U.S. Cl.
  CPC ... *G01J 2005/063* (2013.01); *G01J 2005/202* (2013.01)

(56) References Cited

U.S. PATENT DOCUMENTS

| | | | | |
|---|---|---|---|---|
| 5,426,412 | A * | 6/1995 | Tomonari | G01J 5/04 250/338.1 |
| 5,965,811 | A * | 10/1999 | Kawai | G01F 1/6845 73/114.34 |
| 7,180,063 | B2 * | 2/2007 | Wada | G01J 5/20 250/330 |
| 2008/0210002 | A1 * | 9/2008 | Kamiunten | G01F 1/6847 73/204.23 |

OTHER PUBLICATIONS

Huijsing, J. H. et al., "Monolithic Integrated Direction-Sensitive Flow Sensor," IEEE Transactions on Electron Devices, vol. ED-29, No. 1, 1982 (4 pages).

\* cited by examiner

BOLOMETER FLUID FLOW SENSOR

FIELD

The device and method disclosed in this document relates to bolometer based sensors and, more particularly, to a bolometer based fluid flow sensor.

BACKGROUND

A bolometer is a type of sensor used to measure electromagnetic radiation. A bolometer generally comprises an absorptive element that is connected via a thermal link to a heat sink or thermal reservoir (i.e. a body of constant or near-constant temperature). A thermometer or other temperature sensitive element is attached to or embedded into the absorptive element in order to measure a temperature of the absorptive element. In some bolometers, the absorptive element may itself be the temperature sensitive element.

The essential operating principle of a bolometer is that, when incident electromagnetic radiation or photons are absorbed by the absorptive element, the energy from the radiation raises the temperature of the absorptive element. The change in temperature is measured by the temperature sensitive element in order to measure a magnitude of the absorbed radiation. In order to detect certain types of radiation, the absorptive element can be configured for sensitivity to different ranges of wavelengths.

FIG. 1 shows a microbolometer 100 for detecting infrared radiation 104. The microbolometer 100 includes an absorber 108 which comprises a material configured to absorb infrared radiation and exhibit relative changes in resistance as a result of small changes in temperature. For example, the absorber 108 may comprise of amorphous silicon or vanadium oxide. The absorber 108 is suspended above a substrate 112 by a pair of electrodes 116 in order to thermally isolate the absorber 108 from the substrate 112. A current or voltage is applied to the absorber 108 via the electrodes 116 and changes in resistance of the absorber 108 are monitored in order to detect the radiation 104.

One common use for a sensor such as the microbolometer 100 is for measuring thermal radiation. Objects at any non-zero temperature radiate electromagnetic energy. At temperatures near room temperature, objects primarily radiate infrared radiation, which can be detected by a sensor, such as the microbolometer 100. However, it would be advantageous to use bolometer sensors to implement other kinds of sensors, beyond simple radiation sensors.

SUMMARY

A fluid flow sensor is disclosed. The fluid flow sensor comprises a substrate having a first surface; a cap structure connected to the substrate, the cap structure configured to define a cavity between an inner surface of the cap structure and the first surface of the substrate, the cap structure configured to block infrared radiation from entering the cavity from outside the cap structure; a plurality of absorbers, each absorber in the plurality of absorbers being connected to the first surface of the substrate and arranged at a respective position within the cavity and configured to absorb infrared radiation at the respective position within the cavity; and a plurality of readout circuits, each readout circuit in the plurality of readout circuits being connected to a respective absorber in the plurality of absorbers and configured to provide a measurement signal that indicates an amount of infrared radiation absorbed by the respective absorber.

A method of operating a fluid flow sensor is disclosed, the fluid flow sensor including (i) a substrate having a first surface, (ii) a cap structure connected to the substrate, the cap structure configured to define a cavity between an inner surface of the cap structure and the first surface of the substrate, the cap structure configured to block infrared radiation from entering the cavity from outside the cap structure, and (iii) a plurality of absorbers, each absorber in the plurality of absorbers being connected to the first surface of the substrate and arranged at a respective position within the cavity and configured to absorb infrared radiation at the respective position within the cavity. The method comprises receiving a measurement signal from each readout circuit in a plurality of readout circuits, each readout circuit in the plurality of readout circuits being connected to a respective absorber in the plurality of absorbers and configured to provide a measurement signal that indicates an amount of infrared radiation absorbed by the respective absorber; and determining a flow characteristic of a fluid that flows near the cap structure the measurement signals from at least two readout circuits in the plurality of readout circuits.

BRIEF DESCRIPTION OF THE DRAWINGS

The foregoing aspects and other features of the fluid flow sensor and method of operating the fluid flow sensor are explained in the following description, taken in connection with the accompanying drawings.

DETAILED DESCRIPTION

Figure 1:
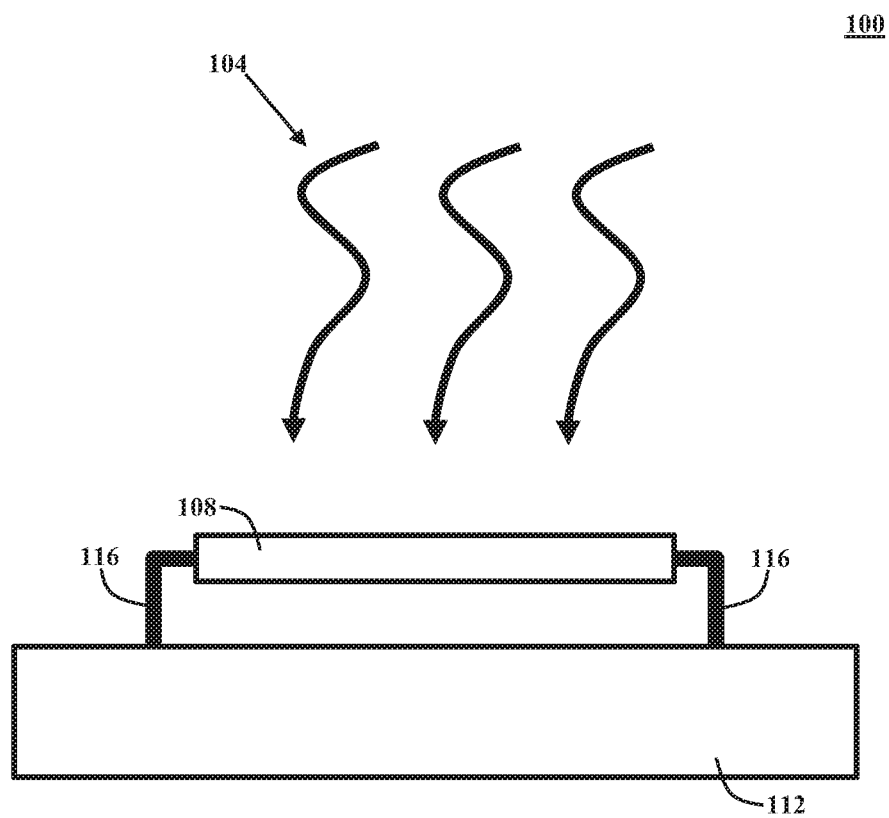
FIG. 1 shows a prior art microbolometer for detecting thermal radiation.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one skilled in the art which this disclosure pertains.

Figure 2:
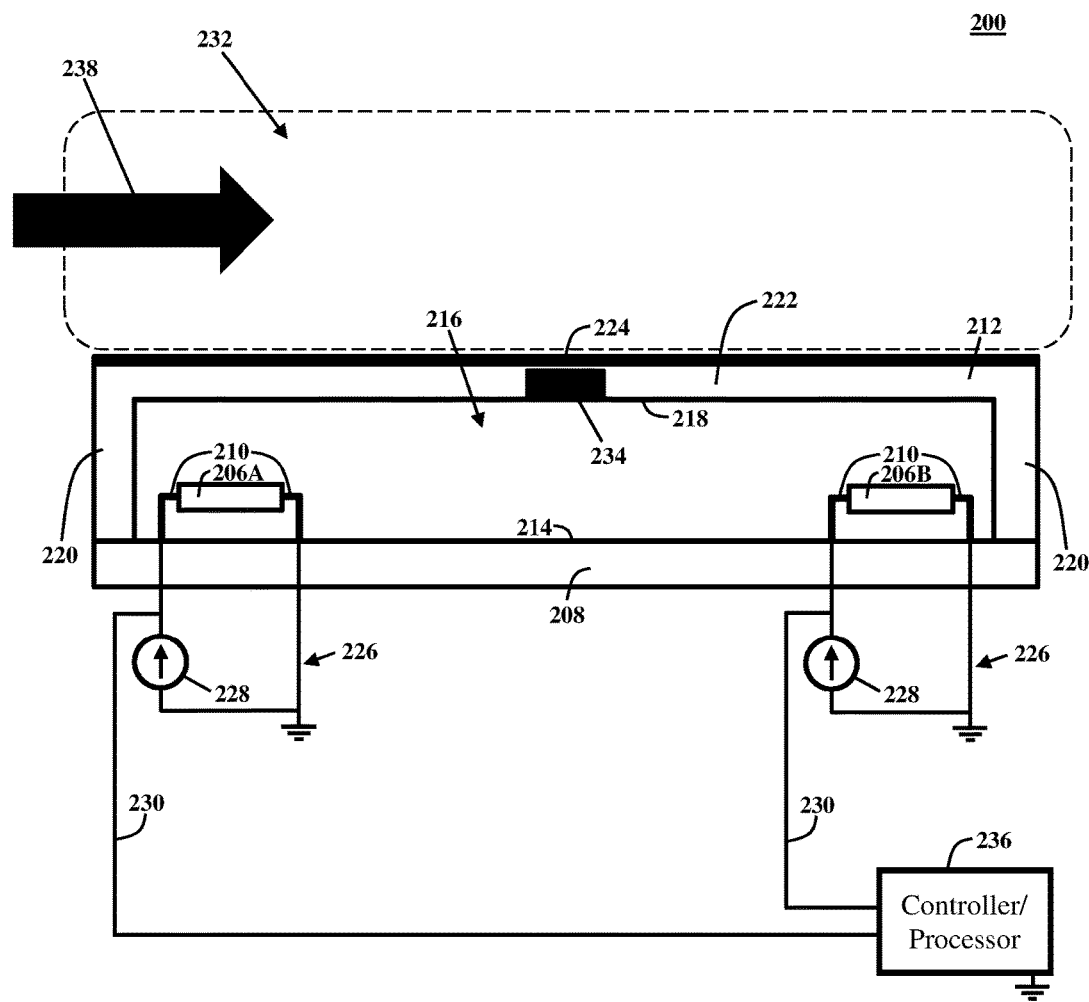
FIG. 2 shows a bolometer based fluid flow sensor.

FIG. 2 shows a fluid flow sensor 200. The fluid flow sensor 200 includes a substrate 208. A plurality of absorbers 206A and 206B are suspended above a substrate 208, each by a pair of electrodes 210. The fluid flow sensor 200 further includes a cap structure 212 formed upon or connected to an upper surface 214 of the substrate 208. The cap structure 212 has a shape configured to define a cavity 216 that encompasses the absorbers 206A and 206B. In particular, the cavity 216 is defined between an inner surface 218 of the cap structure 212 and the upper surface 214 of the substrate 208.

In one embodiment, a near-vacuum pressure is present in the cavity 216. In one embodiment, the cap structure 212 includes wall portions 220 that extend from the upper surface 214 of the substrate 208. The wall portions 220 provide support for a top portion 222 of the cap structure 212 that is positioned above the absorbers 206A and 206B, opposite the substrate 208.

The cap structure 212 is configured to block infrared radiation from entering the cavity 216. Particularly, in one embodiment, an infrared opaque layer of material 224 is deposited or attached to an upper surface of the top portion 222 of the cap structure 212. In other embodiments, the infrared opaque layer of material 224 can be sandwiched inside top portion 222 of the cap structure 212 or deposited on the inner surface 218 of the cap structure 212. In a further embodiment, the entire cap structure 212 can comprise of the infrared opaque material. In either case, the cap structure 212 does not allow infrared radiation to enter into the cavity 216 from outside the cap structure 212. As a result, the absorbers 206A and 206B are not sensitive to thermal radiation emitted by objects near the fluid flow sensor 200. Instead, each absorber 206A, 206B is primarily sensitive to thermal radiation emitted from a portion of the cap structure 212 that is adjacent to the respective absorber 206A, 206B, and thus sensitive to the temperature of said portion of the cap structure 212.

In one embodiment, the fluid flow sensor 200 includes a heating element 234 arranged within the cap structure 212. The heating element 234 is arranged in the center of the top portion 222 of the cap structure 212. In one embodiment, the absorbers 206A and 206B are symmetrically arranged around the heating element 234. In the embodiment shown, in which there are two absorbers 206A and 206B, the absorbers 206A and 206B are arranged on opposite sides of the heating element 234. The heating element 234 is not required for operation of the fluid flow sensor 200. However, as will be discussed in further detail below, sensitivity for fluid flow measurement may be improved by operating the heating element 234 to warm the cap structure 212 to a predefined temperature that is greater than an ambient temperature.

The fluid flow sensor 200 further includes a readout circuit 226 associated with each absorber 206A, 206B and configured to provide a voltage output that is indicative of the amount of radiation absorbed by the respective absorber 206A, 206B. In one embodiment, the readout circuits 226 are integrated circuits built into the substrate 208. In other embodiments, the readout circuits 226 are separately provided. In the embodiment shown, the readout circuits 226 comprise of a constant-current source 228 configured to provide a constant current that flows through the respective absorber 206A, 206B, via the electrodes 210. The readout circuits 226 provide the voltage across the absorber 206A, 206B as an output 230. In an alternative embodiment, the readout circuits 226 may also include a resistance (not shown) arranged in series with the respective absorber 206A, 206B to form a voltage divider. In this embodiment, a constant voltage source (not shown) applies a constant voltage across the voltage divider and either the voltage across the respective absorber 206A, 206B or the voltage across the series resistance is provided as the output 230.

The absorbers 206A and 206B are comprised of a material configured to absorb infrared radiation and exhibit large changes in resistance as a result of small changes in temperature. For example, the absorbers 206A and 206B may comprise of amorphous silicon or vanadium oxide. When infrared radiation is absorbed by an absorber 206A, 206B, the temperature of the absorber 206A, 206B increases. In one embodiment, the absorbers 206A and 206B have a negative temperature coefficient of resistance. Accordingly, as the temperature of the absorber 206A, 206B increases, the resistance between the respective electrodes 210 decreases. As a result of the constant-current source 228 providing a constant current through the absorber 206A, 206B, the voltage across the absorber 206A, 206B, and thus the voltage at the output 230, decreases proportionally with the decrease in resistance of the absorber 206A, 206B. Alternatively, in another embodiment, the absorbers 206A and 206B have a positive temperature coefficient of resistance. Accordingly, as the temperature of the absorber 206A, 206B increases, the resistance between the respective electrodes 210 increases. As a result of the constant-current source 228 providing a constant current through the absorber 206A, 206B, the voltage across the absorber 206A, 206B, and thus the voltage at the output 230, increases proportionally with the increase in resistance of the absorber 206A, 206B.

The working principle of the fluid flow sensor 200 is based around detecting temperature changes in the cap structure 212 with the absorbers 206A and 206B. Particularly, as a fluid 238 flows through a detection area 232, the cap structure 212 is cooled by the fluid 238. However, the fluid 238 does not cool the cap structure 212 uniformly. Particularly, a flow of the fluid 238 in one direction will begin cooling one portion of the cap structure 212 slightly before cooling another part of the cap structure 212. This time delay can be detected by the absorbers 206A and 206B and used to determine a flow direction of the fluid 238.

Additionally, a flow of the fluid 238 in one direction will tend to create a temperature gradient across the cap structure 212. For example, when there is no fluid flow, the heating element 234 is configured to heat the entire cap structure 212 approximately the same temperature. However, if there is a flow of the fluid 238 from left to right, then a temperature gradient will manifest across the top portion 222 of the cap structure 212. Particularly, as the fluid 238 cools the leftmost portion of the cap structure 212, the fluid 238 is warmed and brings the warmth with it as it flows to the right. Accordingly, the cooling effect of the fluid 238 is lessened with respect to rightmost portion of the cap structure 212. In this way, if the fluid 238 flows from left to right, the leftmost portion of the cap structure 212 will cool more than the rightmost portion of the cap structure 212. Furthermore, the magnitude of the temperature gradient will vary depending on a flow speed of the fluid 238. Particularly, if the fluid 238 is flowing rapidly, then the magnitude of the temperature gradient across the cap structure 212 is larger. Conversely, if the fluid 238 is flowing slowly, then the magnitude of the temperature gradient across the cap structure 212 is smaller. This temperature gradient can be detected by the absorbers 206A and 206B and used to determine a flow direction of the fluid 238 and a flow speed of the fluid 238.

Additionally, it is noted that if the fluid 238 is warmer than the cap structure 212, then it may warm the cap structure 212 rather than cool the cap structure 212 as described above. However, a time delay in the warming of the cap structure 212 and a temperature gradient within the cap structure 212 can be similarly be detected by the absorbers 206A and 206B and used to determine a flow direction of the fluid 238.

Figure 3:
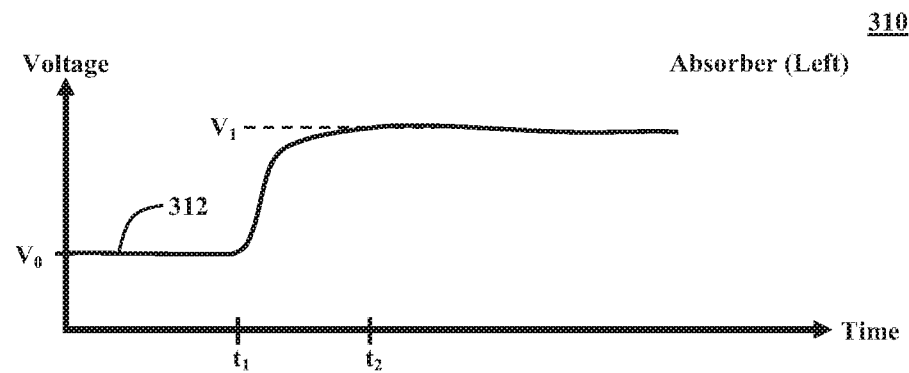
FIG. 3 shows exemplary output signals over time from the fluid flow sensor of FIG. 2, while a fluid begins flowing from left to right.
Figure 3:
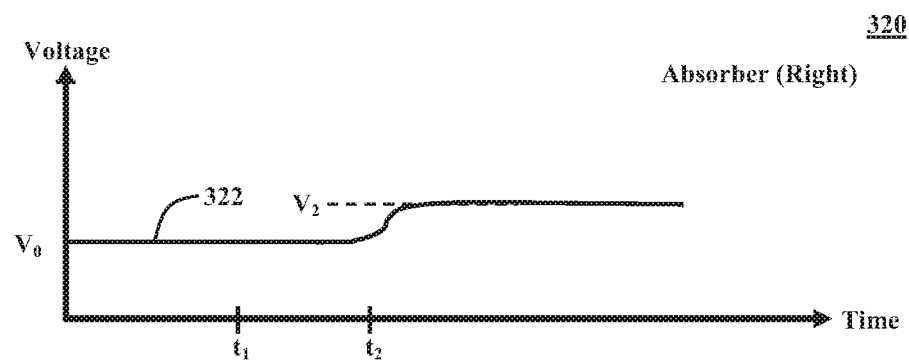

FIG. 3 shows exemplary output signals over time from fluid flow sensor 200 while the fluid 238 begins flowing from left to right. The plot 310 shows a measurement signal 312 that is output from the readout circuit 226 associated with the leftmost absorber 206A shown in FIG. 2. Similarly, the plot 320 shows a measurement signal 322 that is output from the readout circuit 226 associated with the rightmost absorber 206B shown FIG. 2.

Prior to a time $t_1$, the fluid 238 is not flowing in either direction along the left-right axis. As shown in FIG. 3, during this time, the measurement signals 312 and 322 have a voltage $V_0$ which reflects an amount of thermal radiation being radiated by the cap structure 212. The value of $V_0$ generally reflects a temperature of the cap structure 212 at the portions of the cap structure 212 that oppose the absorbers 206A and 206B, which should be roughly the same temperature in the absence of any significant fluid flow in the detection area 232 because the absorbers 206A and 206B are symmetrically spaced around the heating element 234.

At a time $t_1$, the fluid 238 begins to flow from the left to the right. As the fluid 238 flows across the outer surface of the top portion 222 of the cap structure 212, the cap structure 212 begins to cool due to conductive and/or convective transfer of heat from the cap structure 212 to the fluid 238 and away from the fluid flow sensor 200. However, since the fluid 238 is flowing from the left to the right, leftmost portion of the cap structure 212 begins to cool slightly before the rightmost portion of the cap structure 212. Particularly, as shown in FIG. 3, the measurement signal 312 from the leftmost absorber 206A begins to increase at the time $t_1$, as a result of a cooling of leftmost portion of the cap structure 212 that is nearest to the leftmost absorber 206A. Similarly, the measurement signal 322 from the rightmost absorber 206B begins to increase at the time $t_2$, which is subsequent to the time $t_1$, as a result of a cooling of rightmost portion of the cap structure 212 that is nearest to the rightmost absorber 206B. It is noted that difference between the times $t_1$ and $t_2$ has been exaggerating in the plots of FIG. 3 for illustration of this phenomenon. A comparison of the times $t_1$ and $t_2$ can be performed to determine a direction of flow of the fluid 238.

As discussed above, the flow of the fluid 238 also creates a temperature gradient. The effect of this temperature gradient on the measurement signals 312 and 322 is also demonstrated in FIG. 3. As the leftmost portion of the cap structure 212 cools, the measurement signal 312 from the readout circuit 226 associated with the leftmost absorber 206A increases from the voltage $V_0$ to a voltage $V_1$. The difference between the voltage $V_1$ and the voltage $V_0$ reflects an approximate amount of cooling that has occurred in the leftmost portion of the cap structure 212. Similarly, as the rightmost portion of the cap structure 212 cools, the measurement signal 322 from the readout circuit 226 associated with the rightmost absorber 206B increases from the voltage $V_0$ to a voltage $V_2$. The difference between the voltage $V_2$ and the voltage $V_0$ reflects an approximate amount of cooling that has occurred in the rightmost portion of the cap structure 212. It is noted that, depending of the flow speed of the fluid 238 and the operating temperature of the heating element 234, the rightmost portion of the cap structure 212 may not actually cool at all and may even heat up slightly due to the flow of the fluid 238 from left to right. Nevertheless, a comparison the voltages $V_2$ and $V_1$ can be performed to determine a direction of flow of the fluid 238. A comparison the voltages $V_2$ and $V_1$ can also be performed to determine a flow speed of the fluid 238.

Returning to FIG. 2, in one embodiment, the fluid flow sensor 200 further includes a controller 236. In one embodiment, the controller 236 is a discrete control device such as a microcontroller, or other programmable logic device. In other embodiments, the functions of the controller 236 are implemented by a processor of an electronic device in which the fluid flow sensor 200 is integrated. The controller 236 is configured to receive the outputs 230 from the readout circuits 226 associated with each of the absorbers 206A and 206B. In one embodiment, the controller 236 is operably connected to drive circuits for operating the heating element 234 and configured to operate the heating element 234 to warm the cap structure 212 to a particular temperature. The controller 236 is configured to determine flow characteristics, such as flow direction and flow speed, of the fluid 238 flowing through the detection area 232 based on the outputs 230 from the readout circuits 226 associated with each of the absorbers 206A and 206B.

Methods for operating the fluid flow sensor 200 are described below. In the description of the methods, statements that a method is performing some task or function refers to a controller or general purpose processor executing programmed instructions stored in non-transitory computer readable storage media operatively connected to the controller or processor to manipulate data or to operate one or more components to perform the task or function. Particularly, the controller 236 above or a processor of an electronic device in which the fluid flow sensor 200 is integrated can be such a controller or processor. Alternatively, the methods can be implemented with more than one processor and associated circuitry and components, each of which is configured to form one or more tasks or functions described herein. Additionally, the steps of the methods may be performed in any feasible chronological order, regardless of the order shown in the figures or the order in which the steps are described.

Figure 4:
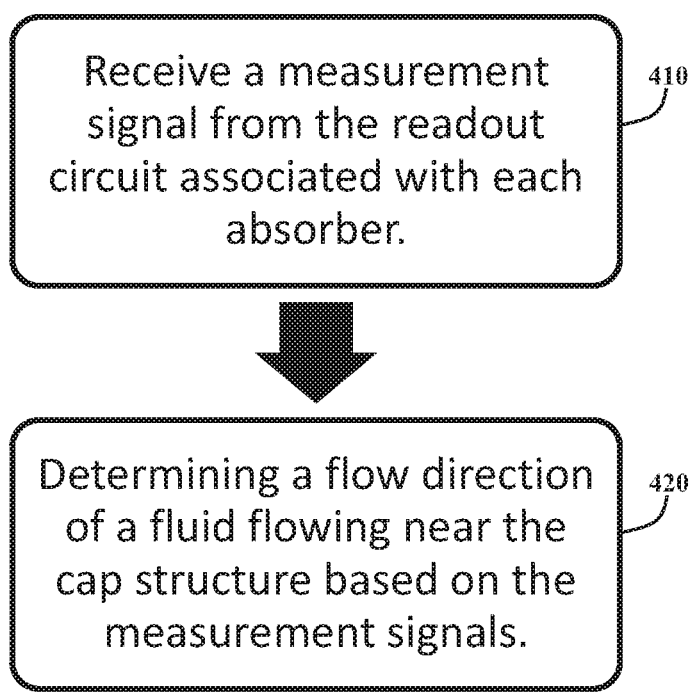
FIG. 4 shows a method of operating the fluid flow sensor of FIG. 2 to determine a flow direction of a fluid.

FIG. 4 shows a method 400 of operating the fluid flow sensor 200 to determine a flow direction of the fluid 238. The method 400 begins with receiving a measurement signal from the readout circuit associated with each absorber (block 410). Particularly, when the readout circuits 226 are powered up, each readout circuit 226 provides a measurement signal at its output 230 that is representative of an amount of radiation being absorbed by the respective absorber 206A, 206B. The controller 236 is configured to receive the measurement signals from the readout circuits 226. The method 400 continues with determining a flow direction of a fluid flowing near the cap structure based on the measurement signals (block 420). Particularly, as discussed in further detail below, the controller 236 is configured to determine a flow direction of the fluid 238 flowing through the detection area 232 near the cap structure 212 based on the measurement signals from the readout circuits 226.

In one implementation of the block 420, the method 400 determines the flow direction of the fluid based on a temperature gradient in the cap structure. Particularly, in one embodiment, the controller 236 is configured to determine that the fluid 238 is flowing in the direction from the leftmost absorber 206A toward the rightmost absorber 206B (i.e. left to right) in response to (i) the measurement signal from the readout circuit 226 of the leftmost absorber 206A indicating that a first amount of infrared radiation is being absorbed by the leftmost absorber 206A (reflecting a temperature of the leftmost portion of the cap structure 212), (ii) the measurement signal from the readout circuit 226 of the rightmost absorber 206B indicating that a second amount of infrared radiation is being absorbed by the rightmost absorber 206B (reflecting a temperature of the rightmost portion of the cap structure 212), and (iii) the second amount of infrared radiation being greater than the first amount of infrared radiation (reflecting that the leftmost portion of the cap structure 212 is cooler than the rightmost portion of the cap structure 212). Conversely, the controller 236 makes a similar determination that the fluid 238 is flowing from right to left if the rightmost portion of the cap structure 212 is cooler than the leftmost portion of the cap structure 212. Put more simply, with respect to the plots of FIG. 3, the controller 236 determines that the fluid 238 is flowing from left to right if $V_1>V_2$ determines that the fluid 238 is flowing from right to left if $V_1<V_2$.

In one implementation of the block 420, the method 400 determines the flow direction of the fluid based on which portion of the cap structure started cooling first. Particularly, in one embodiment, the controller 236 is configured to detect that an amount of infrared radiation being absorbed by the leftmost absorber 206A has begun to decrease at a first point in time (reflecting a time at which the leftmost portion of the cap structure 212 began cooling) based on the measurement signal from the readout circuit 226 of the leftmost absorber 206A. Additionally, the controller 236 is configured to detect that an amount of infrared radiation being absorbed by the rightmost absorber 206B has begun to decrease at a second point in time (reflecting a time at which the rightmost portion of the cap structure 212 began cooling) based on the measurement signal from the readout circuit 226 of the rightmost absorber 206B. Finally, the controller 236 is configured to determine that the fluid 238 is flowing in the direction from the leftmost absorber 206A toward the rightmost absorber 206B (i.e. left to right) in response to the second point in time being subsequent to the first point in time (reflecting that the leftmost portion of the cap structure 212 began cooling before the rightmost portion of the cap structure 212). Conversely, the controller 236 makes similar a determination that the fluid 238 is flowing from right to left if the rightmost portion of the cap structure 212 begins cooling before the leftmost portion of the cap structure 212. Put more simply, with respect to the plots of FIG. 3, the controller 236 determines that the fluid 238 is flowing from left to right if $t_1<t_2$ and determines that the fluid 238 is flowing from right to left if $t_1>t_2$.

Figure 5:
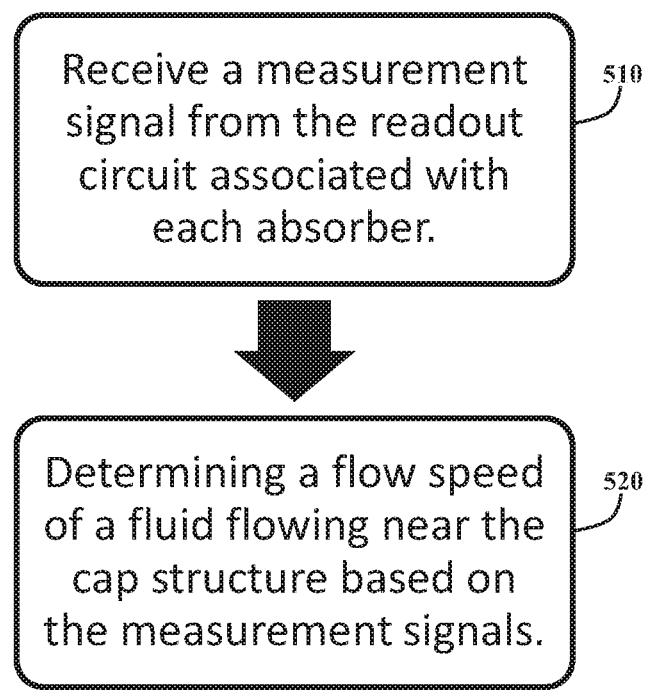
FIG. 5 shows a method of operating the fluid flow sensor of FIG. 2 to determine a flow speed of a fluid.

FIG. 5 shows a method 500 of operating the fluid flow sensor 200 to determine a flow speed of the fluid 238. The method 500 begins with receiving a measurement signal from the readout circuit associated with each absorber (block 510). Particularly, when the readout circuits 226 are powered up, each readout circuit 226 provides a measurement signal at its output 230 that is representative of an amount of radiation being absorbed by the respective absorber 206A, 206B. The controller 236 is configured to receive the measurement signals from the readout circuits 226. The method 500 continues with determining a flow speed or flow magnitude of a fluid flowing near the cap structure based on the measurement signals (block 520). Particularly, as discussed in further detail below, the controller 236 is configured to determine a flow speed of the fluid 238 flowing through the detection area 232 based on the measurement signals from the readout circuits 226.

In one implementation of the block 520, the method 500 determines the flow speed of the fluid based on the magnitude of a temperature gradient in the cap structure. Particularly, in one embodiment, the controller 236 is configured to determine a speed at which the fluid 238 is flowing in the direction from the leftmost absorber 206A toward the rightmost absorber 206B (i.e. left to right) based on a difference between (i) an amount of infrared radiation being absorbed by the leftmost absorber 206A (reflecting a temperature of the leftmost portion of the cap structure 212) and (ii) an amount of infrared radiation being absorbed by the rightmost absorber 206B (reflecting a temperature of the rightmost portion of the cap structure 212). Put more simply, with respect to the plots of FIG. 3, the controller 236 determines the speed at which the fluid 238 is flowing from left to right or from right to left based on a difference between $V_2$ and $V_1$.

It is noted that if the fluid 238 is warmer than the cap structure 212, then it may warm the cap structure 212 rather than cool the cap structure 212 as described above. However, a time delay in the warming of the cap structure 212 and a temperature gradient within the cap structure 212 can be similarly be detected by the absorbers 206A and 206B and used to determine a flow direction of the fluid 238. Additionally, it is noted that similar methods for detecting fluid flow direction and flow speed can be implemented in a fluid flow sensor having a cooling element (rather than the heating element 324) configured to cooling the cap structure 21 to a temperature that is lower than the ambient temperature. In such an embodiment, fluid flow would cause a warming of the cap structure 212 and the methods could detect the warming to determine fluid flow direction and speed. Additionally, such methods could be implemented without a heating element or cooling element in the case where the fluid 238 is warmer or cooler than the ambient temperature, such as in the case of detecting human breath blowing on the fluid flow sensor.

Figure 6:
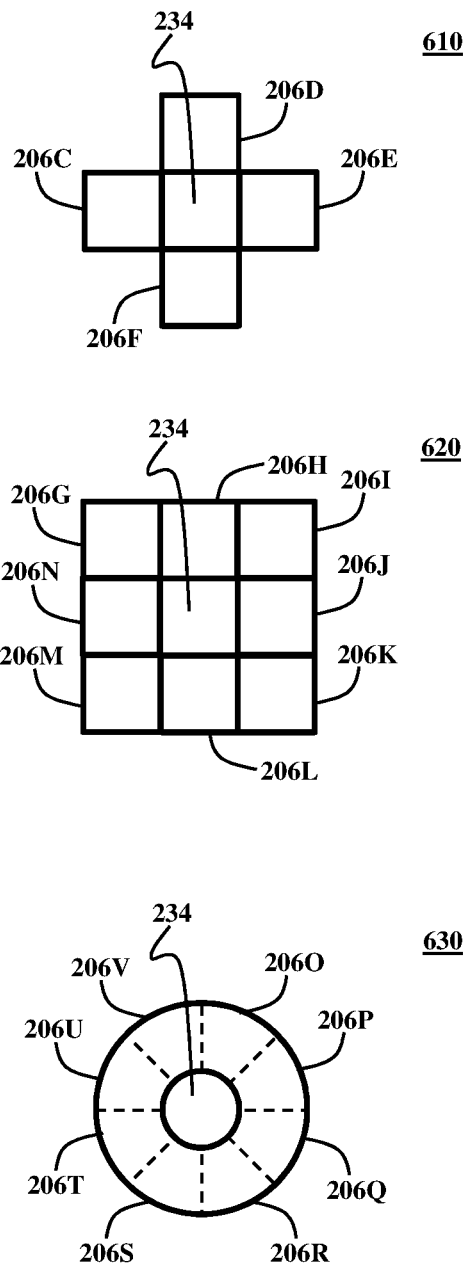
FIG. 6 shows possible arrangements of a plurality of absorbers with respect to a central heating element to enable multi-axis fluid flow sensing.

FIG. 6 shows further possible arrangements of a plurality of absorbers with respect to a central heating element 234 to enable multi-axis fluid flow sensing. The arrangement 610 includes four absorbers 206C, 206D, 206E, and 206F arranged adjacent to a heating element 234. The principles described above can be applied to the arrangement 610 for two-axis fluid flow sensing (i.e. left-right axis, and up-down axis as shown in FIG. 6). The arrangement 620 includes eight absorbers 206G, 206H, 206I, 206J, 206K, 206L, 206M, and 206N arranged adjacent to a heating element 234. The principles described above can be applied to the arrangement 620 for four-axis fluid flow sensing (i.e. left-right axis, up-down axis, and two diagonal axes as shown in FIG. 6). Finally, the arrangement 630 includes a plurality of absorbers 206O, 206P, 206Q, 206R, 206S, 206T, 206U, and 206V arranged symmetrically around a heating element 234. The principles described above can be applied to the arrangement 630 for n-axis fluid flow sensing (where n depends on how many absorbers are included).

In one embodiment, the fluid flow sensor 200 is integrated into a portable electronic device, such as a smartphone. The smartphone may include applications that utilize the fluid flow sensor 200 to implement certain functions, such as displaying the flow data, generating pop-ups or warnings based on the flow data, or performing other operations in response to the flow data.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A sensor comprising:
    a substrate having a first surface;
    a cap structure connected to the substrate, the cap structure configured to define a cavity between an inner surface of the cap structure and the first surface of the substrate, the cap structure including an infrared opaque material configured to block infrared radiation from entering the cavity from outside the cap structure;

a plurality of absorbers, each absorber in the plurality of absorbers being connected to respective electrodes that suspend the respective absorber above the first surface of the substrate at a respective position within the cavity, each absorber in the plurality of absorbers being configured to absorb infrared radiation at the respective position within the cavity; and a plurality of readout circuits, each readout circuit in the plurality of readout circuits being connected to a respective absorber in the plurality of absorbers via the respective electrodes and configured to provide a measurement signal that indicates an amount of infrared radiation absorbed by the respective absorber.

2. The sensor of claim 1 further comprising:

a heating element configured to heat a heated portion of the cap structure, each absorber in the plurality of absorbers being arranged in the cavity near a portion of the cap structure that is adjacent to the heated portion of the cap structure.

3. The sensor of claim 2, wherein:

a first absorber in the plurality of absorbers is arranged in the cavity near a portion of the cap structure that is adjacent to heated portion of the cap structure in a first direction from heated portion of the cap structure; and a second absorber in the plurality of absorbers is arranged in the cavity near a portion of the cap structure that is adjacent to heated portion of the cap structure in a second direction from heated portion of the cap structure, the second direction being opposite the first direction.

4. The sensor of claim 3, wherein:

a third absorber in the plurality of absorbers is arranged in the cavity near a portion of the cap structure that is adjacent to heated portion of the cap structure in a third direction from heated portion of the cap structure, the third direction being perpendicular to the first direction; and a fourth absorber in the plurality of absorbers is arranged in the cavity near a portion of the cap structure that is adjacent to heated portion of the cap structure in a fourth direction from heated portion of the cap structure, the fourth direction being opposite the third direction.

5. The sensor of claim 2, wherein the absorbers in the plurality of absorbers are arranged near portions of the cap structure that are symmetrically arranged around the heated portion of the cap structure.

6. The sensor of claim 1 further comprising:

a controller operably connected to each readout circuit in the plurality of readout circuits, the controller being configured to:
  receive the measurement signal from each readout circuit in the plurality of readout circuits; and
  determine a flow characteristic of a fluid that flows near the cap structure the measurement signals from at least two readout circuits in the plurality of readout circuits.

7. The sensor of claim 6, the controller being further configured to:
  detect that a first amount of infrared radiation is being absorbed by a first absorber in the plurality of absorbers based on the measurement signal from the readout circuit in the plurality of readout circuits that is connected to the first absorber;
  detect that a second amount of radiation is being absorbed by a second absorber in the plurality of absorbers based on the measurement signal from the readout circuit in the plurality of readout circuits that is connected to the second absorber; and
  determine which direction the fluid is flowing between the first absorber and the second absorber based on a comparison of the first amount and the second amount.

8. The sensor of claim 6, the controller being further configured to:
  detect that an amount of infrared radiation being absorbed by a first absorber in the plurality of absorbers began to change at a first point in time based on the measurement signal from the readout circuit in the plurality of readout circuits that is connected to the first absorber;
  detect that an amount of infrared radiation being absorbed by a second absorber in the plurality of absorbers began to change at a second point in time based on the measurement signal from the readout circuit in the plurality of readout circuits that is connected to the second absorber; and
  determine which direction the fluid is flowing between the first absorber to the second absorber in based on a comparison of the first point in time and the second point in time.

9. The sensor of claim 6, the controller being further configured to:
  detect that a first amount of infrared radiation is being absorbed by a first absorber in the plurality of absorbers based on the measurement signal from the readout circuit in the plurality of readout circuits that is connected to the first absorber;
  detect that a second amount of radiation is being absorbed by a second absorber in the plurality of absorbers based on the measurement signal from the readout circuit in the plurality of readout circuits that is connected to the second absorber; and
  determine a speed at which the fluid is flowing in a direction from the first absorber toward the second absorber based on a difference between the first amount and the second amount.

10. A method of operating a sensor, the sensor including (i) a substrate having a first surface, (ii) a cap structure connected to the substrate, the cap structure configured to define a cavity between an inner surface of the cap structure and the first surface of the substrate, the cap structure including an infrared opaque material configured to block infrared radiation from entering the cavity from outside the cap structure, and (iii) a plurality of absorbers, each absorber in the plurality of absorbers being connected to respective electrodes that suspend the respective absorber above the first surface of the substrate at a respective position within the cavity, each absorber in the plurality of absorbers being configured to absorb infrared radiation at the respective position within the cavity, the method comprising:

receiving a measurement signal from each readout circuit in a plurality of readout circuits, each readout circuit in the plurality of readout circuits being connected to a respective absorber in the plurality of absorbers via the respective electrodes and configured to provide a measurement signal that indicates an amount of infrared radiation absorbed by the respective absorber; and determining a flow characteristic of a fluid that flows near the cap structure the measurement signals from at least two readout circuits in the plurality of readout circuits.

11. The method of claim 10 further comprising:

detecting that a first amount of infrared radiation is being absorbed by a first absorber in the plurality of absorbers based on the measurement signal from the readout circuit in the plurality of readout circuits that is connected to the first absorber;

detecting that a second amount of radiation is being absorbed by a second absorber in the plurality of absorbers based on the measurement signal from the readout circuit in the plurality of readout circuits that is connected to the second absorber; and determining which direction the fluid is flowing between the first absorber and the second absorber based on a comparison of the first amount and the second amount.

12. The method of claim 10 further comprising:

detecting that an amount of infrared radiation being absorbed by a first absorber in the plurality of absorbers began to change at a first point in time based on the measurement signal from the readout circuit in the plurality of readout circuits that is connected to the first absorber;

detecting that an amount of infrared radiation being absorbed by a second absorber in the plurality of absorbers began to change at a second point in time based on the measurement signal from the readout circuit in the plurality of readout circuits that is connected to the second absorber; and determining which direction the fluid is flowing between the first absorber to the second absorber in based on a comparison of the first point in time and the second point in time.

13. The method of claim 10 further comprising:

detecting that a first amount of infrared radiation is being absorbed by a first absorber in the plurality of absorbers based on the measurement signal from the readout circuit in the plurality of readout circuits that is connected to the first absorber;

detecting that a second amount of radiation is being absorbed by a second absorber in the plurality of absorbers based on the measurement signal from the readout circuit in the plurality of readout circuits that is connected to the second absorber; and determining a speed at which the fluid is flowing in a direction from the first absorber toward the second absorber based on a difference between the first amount and the second amount.

* * * * *